United States Patent
Coyne

(10) Patent No.: US 7,711,691 B2
(45) Date of Patent: *May 4, 2010

(54) PROJECT MANAGEMENT SYSTEM, METHOD, AND NETWORK, EMPLOYING ODBC-COMPLIANT DATABASE AND SQL SERVERS

(76) Inventor: Patrick J. Coyne, 805 E. Capitol St., Washington, DC (US) 20003

( * ) Notice: Subject to any disclaimer, the term of this patent is extended or adjusted under 35 U.S.C. 154(b) by 622 days.

This patent is subject to a terminal disclaimer.

(21) Appl. No.: 10/661,612

(22) Filed: Sep. 15, 2003

(65) Prior Publication Data

US 2005/0060348 A1    Mar. 17, 2005

(51) Int. Cl.
*G06F 17/00* (2006.01)
(52) U.S. Cl. .................. 707/102; 707/101; 707/103 X; 707/104.1; 707/201; 707/203
(58) Field of Classification Search ..................... 707/3, 707/104.1, 10, 101, 102, 103 R, 4, 103 X, 707/210, 203; 705/14, 1; 709/200, 218, 709/202, 237, 224, 227, 225; 715/501, 507; 717/113; 710/8; 713/170; 711/170
See application file for complete search history.

(56) References Cited

U.S. PATENT DOCUMENTS

| | | | | |
|---|---|---|---|---|
| 5,819,092 A * | 10/1998 | Ferguson et al. ............ 717/113 |
| 6,094,684 A * | 7/2000 | Pallmann .................... 709/227 |
| 6,356,920 B1 * | 3/2002 | Vandersluis .............. 715/501.1 |
| 6,366,921 B1 * | 4/2002 | Hansen et al. .......... 707/103 R |
| 6,408,302 B1 * | 6/2002 | Lee et al. .................... 707/102 |
| 6,516,326 B1 * | 2/2003 | Goodrich et al. ......... 707/104.1 |
| 6,567,814 B1 * | 5/2003 | Bankier et al. ............. 707/101 |
| 6,714,928 B1 * | 3/2004 | Calow ........................... 707/4 |
| 6,901,403 B1 * | 5/2005 | Bata et al. ................... 707/101 |
| 6,985,902 B2 * | 1/2006 | Wise et al. ..................... 707/10 |
| 7,346,754 B2 * | 3/2008 | Kaneko ...................... 711/170 |
| 7,539,621 B2 * | 5/2009 | Harrington et al. ............. 705/1 |
| 2001/0049743 A1 * | 12/2001 | Phippen et al. ............. 709/237 |
| 2002/0055932 A1 * | 5/2002 | Wheeler et al. .......... 707/104.1 |
| 2002/0062439 A1 * | 5/2002 | Cotugno et al. ............. 713/170 |
| 2002/0143774 A1 * | 10/2002 | Vandersluis ................... 707/10 |
| 2002/0178253 A1 * | 11/2002 | Sedlack ...................... 709/224 |

(Continued)

OTHER PUBLICATIONS

Macromedia, "Connecting to Oracle Databases", Macromedia Inc. 2001, pp. 1-7.*

(Continued)

Primary Examiner—Thuy N Pardo
(74) Attorney, Agent, or Firm—MH2 Technology Law Group LLP

(57) ABSTRACT

A software application, system of using the application, and distributed computer network comprising the application, are provided for managing professional services projects. Professional services practices typically employ distributed proprietary applications which complicate the ready transfer of data between and among applications. The database of the present invention is preferably built on an ODBC-compliant platform, such as Lotus Notes, and operates in conjunction with an SQL and Cold Fusion servers. Data is secured from other applications by the SQL and/or the Cold Fusion servers, depending on the format in which the data is maintained in the other applications, and supplied to an ODBC-compliant database, from which the data is accessible by the user.

66 Claims, 5 Drawing Sheets

U.S. PATENT DOCUMENTS

| | | | |
|---|---|---|---|
| 2003/0051210 A1* | 3/2003 | Collier et al. | 715/507 |
| 2003/0144969 A1 | 7/2003 | Coyne | |
| 2003/0144970 A1 | 7/2003 | Coyne | |
| 2003/0163369 A1* | 8/2003 | Arr | 705/14 |
| 2003/0217117 A1* | 11/2003 | Dan et al. | 709/218 |
| 2004/0064500 A1* | 4/2004 | Kolar et al. | 709/202 |
| 2004/0098269 A1* | 5/2004 | Wise et al. | 705/1 |
| 2005/0044132 A1* | 2/2005 | Campbell et al. | 709/200 |
| 2005/0198042 A1* | 9/2005 | Davis | 707/10 |
| 2006/0004731 A1* | 1/2006 | Seibel et al. | 707/3 |
| 2006/0168362 A1* | 7/2006 | Kaneko | 710/8 |
| 2006/0195338 A1* | 8/2006 | Seibel et al. | 705/1 |
| 2007/0094392 A1* | 4/2007 | Stone et al. | 709/225 |

OTHER PUBLICATIONS

Byron Davies et al., "Patching onto the Web: Common lisp hypermedia for the Internet", ACM, May 1997, pp. 66-69.*

Akos Ledeczi et al., "Modeling methodology for integrated simulation of embedded systems", ACM, Jan. 2003, pp. 82-103.*

Waiman Cheung et al., "The model-assisted global query system for multiple databases in distributed enterprises", ACM, Oct. 1996, pp. 421-470.*

* cited by examiner

PROJECT MANAGEMENT SYSTEM, METHOD, AND NETWORK, EMPLOYING ODBC-COMPLIANT DATABASE AND SQL SERVERS

PRIOR APPLICATIONS

This application claims priority on U.S. Provisional Application No. 60/337,158, Method and System for the Management of Professional Services Project Information, filed Dec. 10, 2001 (PJC-0001); U.S. application Ser. No. 10,315,160, for Method and System for the Management of Professional Services Project Information, filed Dec. 10, 2002 (PJC-0003) and U.S. application Ser. No. 10/315,196, for Project Management Database and Method for Managing Project Related Information, filed Dec. 10, 2002 (PJC-0004), each of which are incorporated herein by reference, as if fully set forth herein.

FIELD OF THE INVENTION

The present invention relates to a system, method, and network for managing professional services project information and, in particular, data used in rendering legal services. Specifically, the present invention preferably facilitates the transfer, compilation, aggregation, integration, and/or distribution of data from one or more distributed, proprietary applications that are used in a law practice, and makes the data more readily available to a user, namely, an attorney, client, or their staffs. The data may be maintained in: one or more software applications; proprietary, application-dependent, common, portable, or application-independent formats; structured, semi-structured, or unstructured formats; centralized or distributed database(s); and/or compatible or incompatible formats.

Data typically must be transferred, cleaned, converted, and/or coded from a native format before it can be used by the recipient. Proprietary formats typically result in incompatibilities between databases and applications. Frequently, these incompatibilities are so severe that the data may need to be converted, re-keyed, or otherwise reentered. Data may be coded in one format, converted to another format so that it can be transferred or exchanged, and converted back into the first or other proprietary formats for subsequent processing. Third parties may not have access to the formats used at various stages of processing, requiring further conversion.

BACKGROUND OF THE INVENTION

Professional services practices in general, and legal services in particular, rely on information from disparate sources. A law practice typically maintains information relating to: clients; matters being worked on for those clients; projects undertaken in connection with those matters; tasks that are necessary to complete those projects; and events relating to those matters and/or projects. Data may include, without limitation: identifying and/or contact information for clients, potential clients, adversaries, counsel, foreign associate counsel, witnesses, vendors, experts, investigators, and others involved in the matter or project; billing information; documents, references, exhibits, and other records; email and other electronic records; fact and legal research; correspondence; pleadings; docketing; finance, budgeting, timekeeping, expense, billing, general ledger, accounts receivable, accounts payable, collection, and other financial data; and, potentially, a wide variety of other project management tools.

Document management and/or document assembly systems are typically employed in a legal practice to generate, maintain, manage, and retrieve work product. Many legal practices maintain "libraries" of prior work product, work flow forms, and/or "precedents." These resources improve efficiency as well as help maintain quality control, providing a knowledge base for training younger attorneys and efficiently generating work product.

Graphics, modeling, presentation, and visualization tools are becoming more widely used in law practices. In addition, as in medicine, various expert systems are commonly used, particularly in specialized areas of practice, such as litigation, securities, real estate, intellectual property, and others. More recently, the demand for case management systems has increased, particularly among in-house law departments.

A law practice typically maintains these types of information in various custom, proprietary, specialized, mass-marketed, and/or open software applications. These applications typically are not adapted to, and in many instances, are not capable of, cooperating or communicating with one another. Data, therefore, must frequently be converted or re-entered in various applications.

One of the greatest strengths of modern computer networks is their adaptability. They support a wide variety of different software applications and enable users to share work product. They are robust and are expressly designed to reduce the risk of data loss. Moreover, users may be permitted to tailor their computing environment to their individual work patterns. This is highly desirable; yet, this pattern of individualized computing fosters a proliferation of software applications, operating systems, and network management applications. The architecture of computer networks has compounded the difficulties of managing these disparate systems.

Networks used in a law practice also typically combine various hardware components: personal computers; network and mainframe components; servers and routers; desk tops, laptops, and hand-helds; remote access devices; personal digital assistants (PDAs); wireless access devices; portable email devices; various output devices; and a bewildering array of accessories. Each typically has a different operating system, of different vintage, quality, and capability. Apart from the substantial challenges this imposes on network managers and systems administrators, it has made the ready transferability of data between components more difficult, if not impossible.

In a typical law practice, for example, information systems and software may include, without limitation:

Hard copies of documents, files, specimens, and exhibits;
Physical exhibits and samples;
Electronic records;
Audio, video, voice mail, and other records;
Network Operating Systems software (typically some variant of Windows, i.e., 2000, NT, XP, 98, or 95; IBM OS2; Apple; etc.);
Records Management Systems (files; bar coding; indexers; specialized records management applications; etc.);
Document Assembly Systems (such as "IPDAS" in an intellectual property practice setting; or any of a variety of other document assembly systems);
Document Management Systems (such as Hummingbird; PC DOCS; SoftSolutions; iManage; etc.);
"Knowledge Management" Systems (which are typically customized or proprietary software, or some modified version of a Document Management System, etc.);
Email systems (ccmail; Notes mail; Microsoft mail; Novell Groupwise; etc.);

Docketing systems (for example, CPI; Dennemeyer; IP Master; Patsy; IPPO; etc., for intellectual property practices; and other docketing systems for securities, tax, litigation, or other practice areas);

Word processing systems (WordPerfect; Microsoft Word; etc.);

Scheduling and calendaring systems (Lotus Notes; Microsoft Outlook; Novell Groupwise; etc.);

Relationship Management and/or Contact Information (interAction; Outlook; Notes; Elite Apex; Aptus; customized or proprietary software; etc.);

Litigation Support (Summation; LiveNote/VideoNote; Access; CaseMap/TimeMap; Concordance; Trial Director; JFS Litigator's Notebook; Sanction; Folio Views; iConnect; DB Textworks; Isys; Introspect; BRS Search; RealLegal; E-tech; Ipro; etc.);

Electronic evidence service vendors (Ontrack; Electronic Evidence; Applied Discovery; Fios; Daticon; Deloitte & Touche; etc.);

Electronic portals (such as those supplied by vendors such as SV Technology; Plumtree; Sequoia; etc.);

Desktop fax software (RightFax; Legal Fax; etc.);

Time entry systems (DTE; Carpe Diem; CMS Open; Elite; custom or proprietary systems; etc.);

Accounting systems (Elite; CMS Open; Elite for Windows NT; TMC; Rippe & Kingston; custom or propietary in-house; etc.);

Database applications (Lotus Notes; Microsoft Excel; Microsoft Access; Corel Quatro Pro; FoxPro; Lotus 123; Concordance; etc.);

Presentation applications (Microsoft PowerPoint; Corel Presentations; Sanction; Trial Director; etc.);

Project Management support systems (Microsoft Project; Project Gateway;

etc.);

Critical path, probability assessment, and risk analysis tools (such as TreeAge software; etc.);

Various specialty applications (such as, project management, flowcharting, PERT and GANT charting, budgeting tools, etc.);

Case Management systems (LawPack (Hummingbird); Corprasoft; Elite Information Group; Miratech; ProLaw (West Group); RealLegal; and PWC and other systems support vendors; etc.); and A potentially a wide variety of other software applications.

Data accessed by these various applications may be maintained centrally, on a distributed basis, or in a combination of central and distributed database systems. Prior to the present invention, data was not readily transferable between the various applications used in a professional services practice. Copending U.S. application Ser. No. 10/315,160 [PJC-0003] and Ser. No. 10/315,196 [PJC-0004], both of which are incorporated herein by reference, include a detailed discussion of some of the problems caused by the lack of portability and application-dependence of data of prior known applications.

There has long been an unresolved need for secure, reliable, simple data transfer between software applications used in a business. Prior known approaches have failed to meet these long-felt and unresolved needs, particularly in the legal services setting. The commercial software industry has generally overlooked the legal services market. The legal market, therefore, have had to rely on either mass-marketed software applications that are not adapted to its particular needs, and/or customized and/or proprietary solutions that are expensive, complex, and limited in their flexibility, adaptability, and, ultimately, effectiveness.

Neither centralized, mass-marketed, nor customized software applications have resolved these problems. Centralized applications have been applied in certain general business environments but have not been generally embraced by legal professionals.

With respect to mass-marketed applications, users typically end up securing multiple, competing software applications. This results in duplication in purchasing and training, while only certain programs or features of each application are actually used. Although many mass-marketed applications advertise that they are "open," they are fundamentally proprietary systems and are "open" only to the extent that the vendor has decided to enable development of certain compatible applications. These proprietary formats are generally not compatible with other software applications. Specifically, the data is not readily portable or application-independent. Even in those situations in which mass-marketed software applications have been marketed with the express representation that data is transferable between them (such as between Microsoft Word and Corel WordPerfect, or between various applications in a single manufacturer's suite of applications software such as Microsoft Office), typically, they are not.

Incompatibilities regularly cause catastrophic failures. Windows XP and other operating systems have not resolved these problems. These types of failures, however, are unacceptable in a modern business environment. Rather, simplicity, transferability, speed, reliability, and security are required. Mass-marketed application software has not met these challenges. Instead, it continues to include known—and remediable—defects.

Incompatibility, flowing from the proprietary nature of various software platforms, ultimately requires that data be converted or that the same information be re-entered in multiple applications. This is wasteful and introduces multiple opportunities for error in data entry, maintenance, and retrieval. Proprietary software applications also require extensive investment in training, retraining, and support. Typically, the more powerful the tool, the more rigorous the training requirements. In a professional services practice, such as legal services, the individuals who could most benefit from these tools (the general counsel in a law department or partners in a law firm) are the individuals whose time is most highly valued and whom the organization can least afford the extensive investment in training, retraining, and support time required to gain proficiency in multiple mass-marketed software applications.

Ideally, the data used in a law practice should be exchanged on a commodity basis. The data should be portable or, preferably, application-independent. Although distributed PC-based networks could have fostered that result, they have had the opposite result. PC-based network systems have fostered the proliferation of incompatible, proprietary, software applications. These proprietary systems have resulted in: maintenance problems; undue complexity in systems architecture and design; excessive network systems support requirements; the need for duplicate copies of applications software; increased systems maintenance; increased cost; impaired access to data; increased training time and expense; diversion of professional time to non-productive uses; and, ultimately, impairment of access to the information needed to run the practice or business.

None of the prior known approaches addresses the need to integrate and make more readily transferable the data used on a distributed basis in a law practice. Although the Internet has fostered the development of a series of protocols that enhance the transferability of data, such as POP (Post Office Protocol), HTML (Hypertext Markup Language), XML (extensible Markup Language), WAP (Wireless Application Protocol), SOAP (Simple Object Access Protocol), and a variety of others, no consensus has yet emerged for standards or protocols for data used in a professional services practice. Moreover, even those web-based applications of which the Applicants are aware fail to aggregate the information to manage a legal project in a simple, easy to use interface. Rather, typically, the user must access multiple software applications through one or more web-based interfaces, in order to access the desired information.

Thus, prior to the present invention, none of the systems of which Applicants are aware facilitate the ready transfer of data between the various distributed applications used in a legal services practice. None provides data in a substantially portable or application-independent fashion. Moreover, none of the prior known approaches have resolved the need to facilitate the transfer of data between outside professional service providers and their clients. Thus, there remains a long-felt and unmet need for a simple, efficient, and effective means for enabling data to be transferred between various software applications and computers in an internal and/or external network and, in particular, in the setting of a professional services practice.

OBJECTS OF THE INVENTION

It is, therefore, an object of a preferred embodiment of the present invention to provide a project management software database system, method, and network, comprising ODBC-compliant database means, SQL server means, and Cold Fusion server means, adapted to cooperate with one another to manage the data used in a legal practice in a substantially application-independent manner, or at least in a manner that the data are substantially portable.

An additional object of a preferred embodiment of the present invention is to provide a Lotus Notes database case management application, adapted to cooperate with SQL server and Cold Fusion server means, to enhance the transferability and/or portability of data between or among various distributed applications of the types that are used in a legal practice.

Additional objects and advantages of the invention are set forth, in part, in the description which follows and, in part, will be obvious from the description or may be learned by practice of the invention. The objects and advantages of the invention will be realized in detail by means of the instrumentalities and combinations particularly pointed out in the appended claims.

BRIEF SUMMARY OF THE INVENTION

As illustrated in the accompanying diagrams and described in the accompanying claims, the present invention preferably is a method and system for improving the accessibility and transferability of various data and/or information resources used in the management of professional services and, in particular, legal services. Specifically, the invention is preferably a system, method, and network comprising a practice management application to aggregate data from two or more software applications in which the data is maintained in incompatible formats to make the data available to the user through a single interface.

In an embodiment, the present invention is a system for managing data relating to a professional legal services project and making the data available to a user, where the data is maintained in two or more software applications having different formats, comprising: a first software application for maintaining data in a first ODBC-compliant format; a second software application for maintaining data in a second format other than an ODBC-compliant format; a SQL server means; a Cold Fusion web server means; a professional services project management application; said SQL server means being adapted to communicate with said first software application and said professional services project management application to transfer the data from said first software application to said professional services project management application; said Cold Fusion server means being adapted to communicate with said SQL server means and said professional service project management application; said Cold Fusion server means cooperating with said SQL server means to communicate with said second software application through said SQL server means to transfer the data from said second software application to said professional services project management application; said professional service practice management application further comprising an interface for communicating the data to the user.

In an alternative embodiment, the present invention is a method of managing professional services project information, comprising the steps of: maintaining data in a first software application in a first, ODBC-compliant format; maintaining data in a second software application in a second format other than an ODBC-compliant format; communicating the data from said first software application to a professional services project management application through a SQL server means; communicating the data from said second software application to said professional services project management application through said SQL server means cooperating with a Cold Fusion web server means; providing the data to the user through said professional services project management application.

In another alternative embodiment, the present invention is a distributed computer network adapted for use in a professional service practice, comprising: a first software application for maintaining data in a first, ODBC-compliant format; a second software application for maintaining data in a second format other than an ODBC-compliant format; a SQL server means; a Cold Fusion web server means; a professional services project management application; said SQL server means being adapted to communicate with said first software application and said professional services project management application to transfer the data from said first software application to said professional services project management application; said Cold Fusion server means being adapted to communicate with said SQL server means and said professional service project management application; said Cold Fusion server means cooperating with said SQL server means to communicate with said second software application through said SQL server means to transfer the data from said second software application to said professional services project management application; said professional service practice management application being adapted to provide an interface for communicating the data to the user.

In other embodiments of the present invention, the SQL server may be adapted to communicate directly with the practice management application, or through the Cold Fusion web server. In additional embodiments, the practice management application may be adapted to communicate with the software application through means other than a SQL server or Cold Fusion web server.

It is to be understood that both the foregoing general description and the following detailed description are exemplary and explanatory only, and are not restrictive of the invention as claimed. The accompanying drawings, which are incorporated herein by reference and constitute a part of the specification, and in which like numerals are used to refer to like elements, illustrate certain embodiments of the invention, and together with the detailed description, serve to explain the principles of the present invention.

DETAILED DESCRIPTION OF PREFERRED EMBODIMENTS

Figure 1:
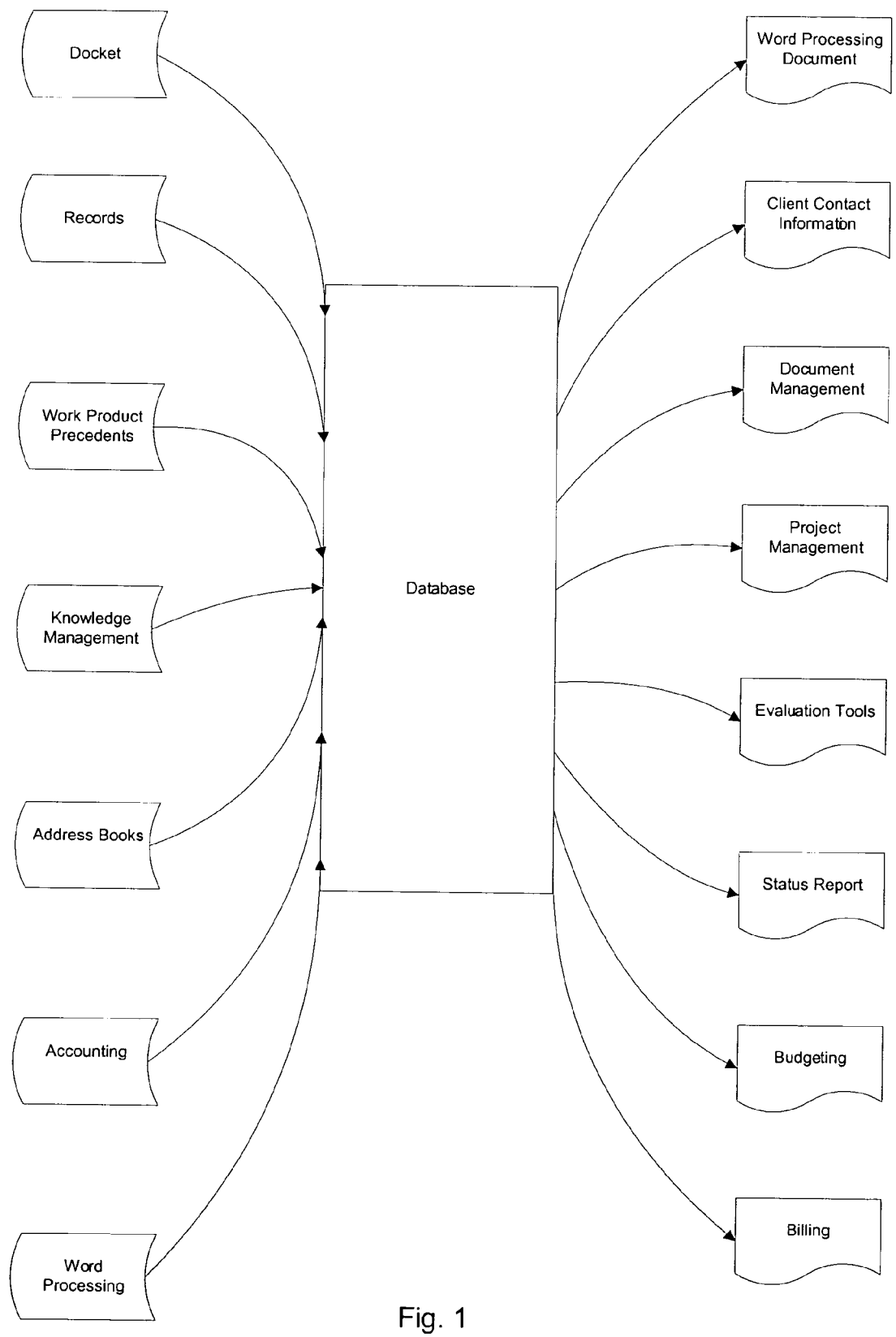
FIG. 1 is a flowchart depicting the interrelationship of various information resources and applications that may be used in conjunction with a database of a preferred embodiment of the present invention.
Figure 2:
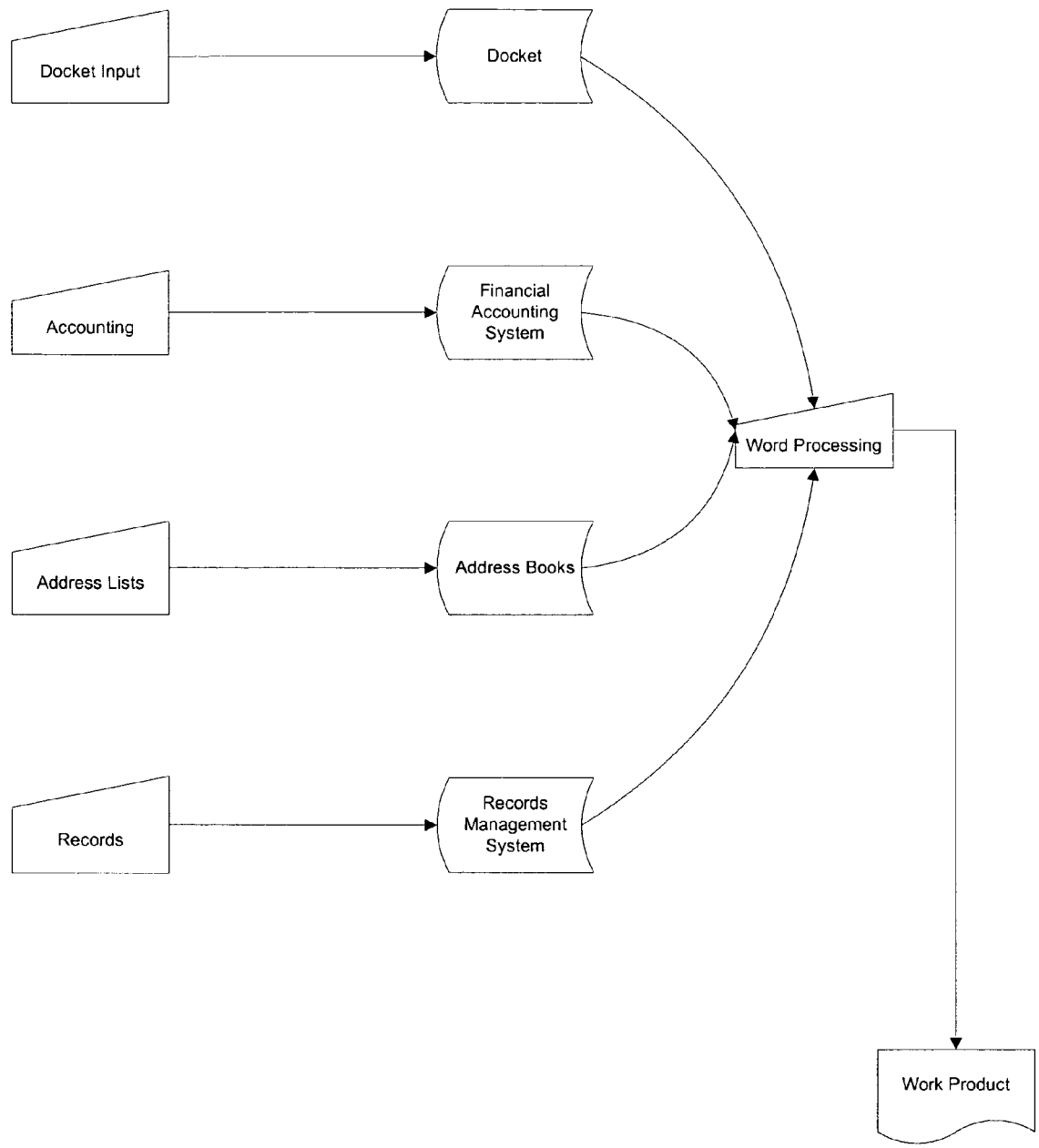
FIG. 2 is a flowchart illustrating the flow of various types of data into a single application in a legal practice, in a manner known prior to the present invention, illustrating the potential conflicts between multiple data sources for address information being supplied to the application, in this example, a word processing application.
Figure 3:
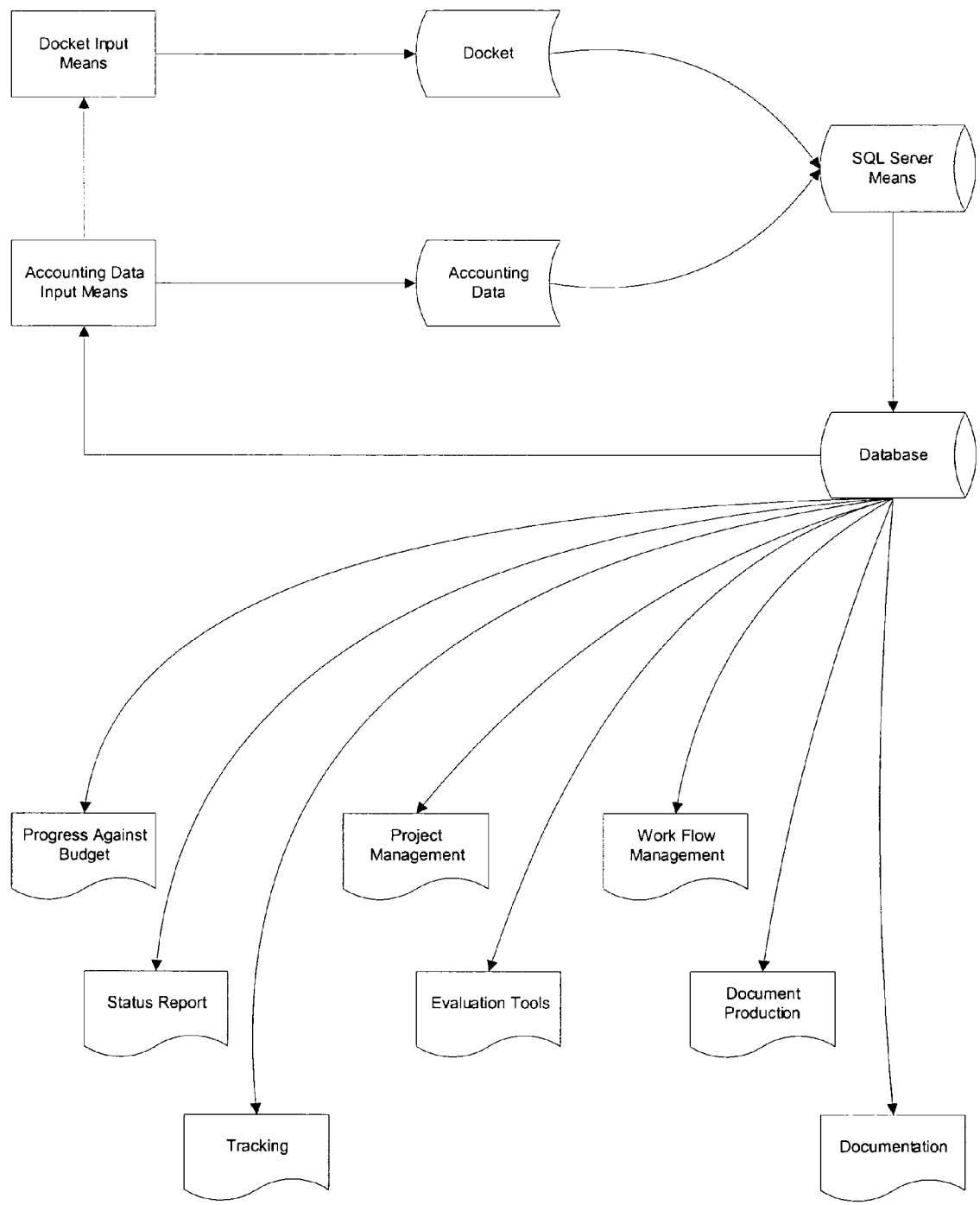
FIG. 3 is a flowchart depicting SQL server means for transferring data from various software applications to a Lotus Notes database practice management application.
Figure 4:
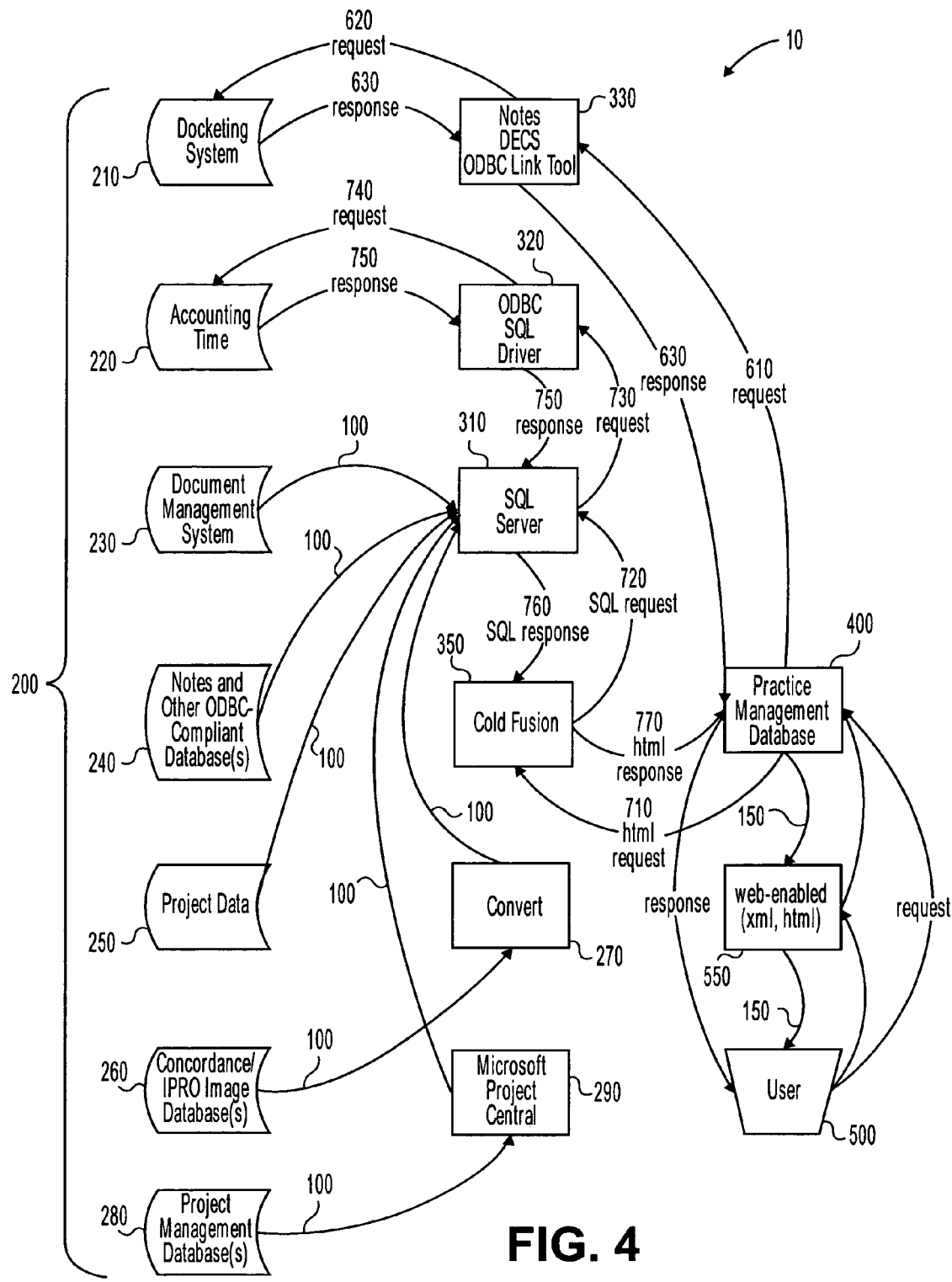
FIG. 4 is a flowchart depicting a preferred embodiment of a system and network of the present invention, in which the practice management application database communicates with a SQL server means through a Cold Fusion server means.
Figure 5:
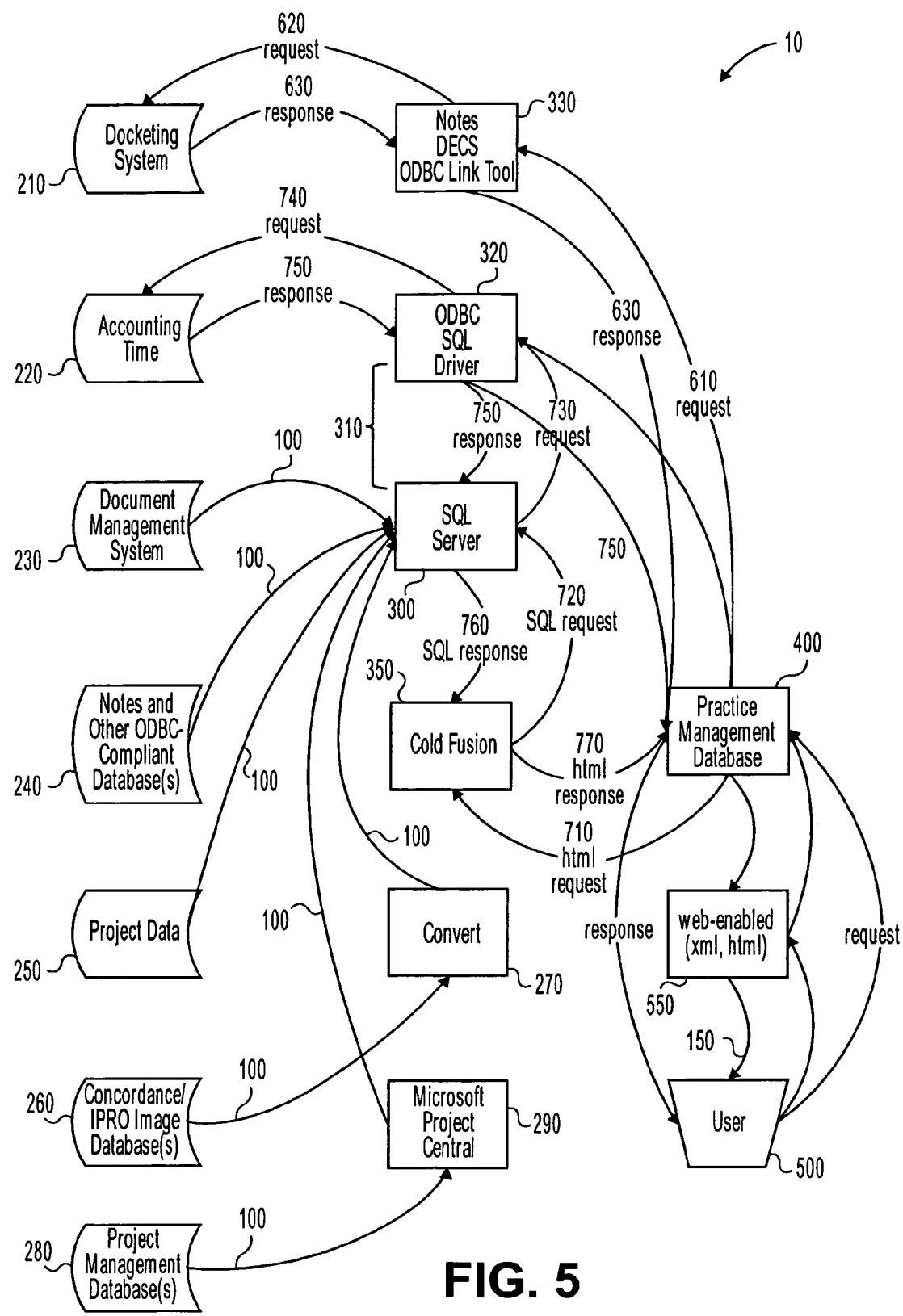
FIG. 5 is a flowchart depicting an alternative preferred embodiment of a system and network of the present invention, in which the practice management application database communicates with a Cold Fusion web server means and with SQL server means.

Reference will now be made in detail to a preferred embodiment of the system and method of the present invention, an example of which is illustrated in the accompanying drawings. A preferred embodiment of the present invention, in the setting of a law practice, is shown in FIGS. 4 and 5 as 10. In a preferred embodiment, the present invention comprises a system, method of use, and network for aggregating and/or transferring data useful in the management of a legal services engagement. The present invention preferably is embodied in an ODBC-compliant, Lotus Notes database, cooperating with SQL and Cold Fusion servers. The SQL database queries one or more "proprietary" distributed databases (such as a "proprietary" docketing, accounting, word processing, time and billing, etc., system).

"Proprietary," "Common," "Portable," and "Application-Independent" Formats

For purposes of the present application, Applicants distinguish between "proprietary" formats on one hand, and "common," "portable," or "application-independent" formats on the other. In principle, databases should be application-independent. In practice, however, databases are built for specific applications. Blaha, Michael, "A MANAGER's GUIDE TO DATABASE MANAGEMENT" (Prentice Hall 2001) at 3. Professional services practices in general, and legal practices in particular, rely on a variety of proprietary applications. Many are legacy systems, having proprietary formats. Consequently, the data used in a typical legal services project is substantially application-dependent. Consequently, the data is not readily transferable or portable among applications.

As used in the present application, the terms "common," "portable," and "application-independent" are intended to convey a sense of the relative transferability of the data, and not an absolute or particular degree of transferability or application-independence. These terms are not intended to imply that the data is perfectly application-independent or completely fungible between software applications and/or operating systems, without error, or without requiring modification or adaptation. "Portable" formats preferably include standards, such as ODBC protocols and/or standards, either that are in existence today or that will be developed in the future. Application-independent formats include, without limitation, relational databases; SQL databases; and XML and HTML standards and protocols. Application-independent formats may also include various other web-enabled applications and protocols; SOAP; WAP; Open Source applications; Lotus Enterprise Integration; ZMerge; or other applications that are adapted to permit, facilitate, or enhance the transferability of data between applications.

The term "proprietary," in conjunction with data formats of the present invention, refers primarily to proprietary software applications, of the types that are typically used in a law or other professional services practice. These may include, by way of example and not limitation, legacy systems and various hierarchical databases. The use of the term "proprietary" includes but is not limited to data that is entirely application-dependant or exclusive to a single application. Nor is it intended to convey an absolute sense of incompatibility or exclusivity. Rather, the term "proprietary" is intended to convey a relative degree of difficulty of transfer of data.

For example, the relative degree of difficulty of transferring data from and/or among the various docketing and/or accounting applications of the type that were known in the legal market prior to the present invention is considered "proprietary." Docketing systems (such as CPI, Dennemeyer, Master Data, Pattsy, or IPPO in an intellectual property practice), and accounting systems (such as Broadway, TMC, and/or Elite), prior to the present invention, had limited ability to transfer data to other applications used in the enterprise, such as word processing systems (such as WordPerfect and Word), document assembly systems, spreadsheets (such as Quarter, Excel, and Lotus 123), project management systems, and other software applications.

Although Microsoft and Corel each represented, prior to the present invention, that documents could be transferred readily between their respective word processing programs (Word and WordPerfect), errors and critical failures occurred frequently. Legacy knowledge bases in a prior version of a software platform are frequently lost upon conversion or upgrade, requiring costly and time-consuming efforts to convert individual documents and/or data to the newer release format. Although it may be possible to transfer data between these various "proprietary" applications, substantial effort is required to convert or transfer the data. These applications are not specifically designed to render the data readily transferable between them.

The term "proprietary" may be understood in some other settings to convey some claim of exclusive ownership, such as rights accorded by patent, trademark, copyright, or trade secret protection. The term "proprietary" as used in this application, however, does not indicate exclusive ownership rights but, rather, is used in the sense of the relative degree of application-dependence of the data. Formats that may enable a high degree of transferability and accessibility (such as .pdf, .tif, .jpg, and a wide variety of other data formats and protocols that are known in the art or may later be developed) may be "proprietary" in the sense that they are subject to claims of exclusive rights but should be considered to be "portable" for purposes of the present invention. Similarly, proprietary applications may use relational or SQL databases, XML or HTML coding, and be considered application-independent in the sense of the present invention. Similarly, some "open source" software operating systems and/or applications may be public domain information in terms of ownership rights but may lack the requisite degree of data transferability.

Data

In a preferred embodiment of the present invention, as shown in FIGS. 4 and 5, data 100 is transferred, from one or more native applications 200 in which it is normally stored, to Notes database 400, through SQL Server means 310 and Cold Fusion server means 350. Alternatively, as shown in FIG. 5, SQL server means 310 queries native applications 200 and secures data 100 and transfers it to Notes database 400. Data 100 can be read or transferred to applications 500, or transferred directly to the end user applications 550. In a preferred embodiment of the present invention, the database system enables the user to access, in substantially application-independent format, data 100 that was stored in the native applications in one or more substantially application-dependent, or proprietary, formats. ODBC-compliant, Lotus Notes database, thus, can serve as a data warehouse, bringing together disparate data that was not reconciled using prior known approaches.

Data means 100 comprises data used in rendering legal services. Data 100 may be in any format: proprietary, application-dependent, common, portable, or application-independent. In a preferred embodiment, data 100 may be maintained in a proprietary data format among the various distributed native applications 200. Data 100 preferably further comprises any suitable method, process, or system, for securing the data, such as key entry, voice recognition, optical scanning and/or imaging, data transfer, reading data from any medium, conversion, or any other suitable techniques.

In a preferred embodiment, data means 100 preferably comprises: client means, matter means, and event means. In alternative preferred embodiments, data means 100 further comprises any one or more of the following: project means; task means; documentation means; budget means; expense means; project management means; project evaluation means; and other data.

Client Data

Client data preferably comprises data about the client for whom the project is being performed. Client data typically are maintained in a docketing and/or accounting system. The client is established as a client of the firm, after conflicts have been cleared with respect to the representation. The data may be key entered into the accounting system and preferably transferred to the docketing system and other software applications in which the data is needed, such as word processing and/or address books, or vice versa. Prior to the present invention, the data was typically key-entered separately into each application (conflicts, accounting, docketing, word processing, time and billing, etc.) in which it was needed.

In an alternative preferred embodiment of the present invention, Client data further comprises one of more of the following: Bibliographic Information; and Service Provider Information. Bibliographic information preferably comprises one or more of the following: Client Name; Client Number; Primary and Supplemental Contact Name(s) and Address(es); Client's Line of Business; Client's Products/ Services; and/or any other pertinent information. In an alternative preferred embodiment, Service Provider Information further comprises Attorney Information. The Attorney Information preferably comprises one or more of the following: Referral Information; Originating Attorney; Billing (or Client Relationship) Attorney; Supervising Attorney; Working Attorney(s); Billing Arrangement; Billing Rates; Alternative Fee arrangements (if any); and any other client of the firm to whom the client is related.

Matter Data

Matter data preferably comprises data about the matter for the client for whom the project is being performed. Matter data typically are established in the same fashion as client data. Address information is typically linked to a client and/or matter. Thus, while the project is proceeding, client and/or matter data are preferably available and client data, address data, and matter data, are coordinated between accounting, docketing, address, and other applications in which the data is needed.

Matter data preferably further comprises one of more matters adapted to the professional services being rendered by the professional services firm to the client. For example, in the setting of an intellectual property law practice, matter data may comprise any one or more of the following types of matters: Patent; Trademark; General Counseling and Advice; Administrative Proceedings; Litigation; Licensing and Agreements; and matters for specific third parties.

Matter data tracked by the present invention preferably includes any one or more of various data about the matter, including without limitation: Matter Name; Matter Number (s); Description; Matter Creation Data; Responsible Professional; Billing Contact(s) for that matter; any related documentation (including images); Powers of Attorney; pertinent contacts; and pertinent details about the matter. Client Name and Client Number information is preferably adapted to be transferred automatically, in order to avoid the necessity of key entry or manual transfer of the data.

Project Data

Project data may be used to identify multiple projects that are being carried out in conjunction with the same client and/or matter. Project data preferably differentiates between multiple projects under the same general matter. Projects may be aggregated under Client, Matter, or both. Alternatively, Project data may be omitted and project level information maintained at the Client and/or Matter level.

For example, Project data may be identified at the Client level, enabling multiple matter numbers to be issued for the same project in the accounting and/or docketing systems. Alternatively, Projects could be identified at the Matter level, enabling multiple projects to be identified for the same matter in the firm's accounting and/or docketing system. Similarly, projects could be identified at both the client and matter levels, if desired. This flexibility enables the user to more precisely track activity or tasks in conjunction with rendering the professional services.

Project data preferably includes various data about the project, including without limitation: Type of project; Identifying numbers or codes; Description of the project; Country and Foreign Associates; Addresses; Comments; any Related Documentation; Affiliated Parties; Counsel, Courts, and Administrative Tribunals; Case Numbers; Responsible Person(s) or Person(s) related to the project; Serial Numbers; any pertinent information related to any applications, registrations, or grants; Transfer information; Pertinent Dates; any other suitable information relating to the project. In alternative preferred embodiments, Project data is further adapted to cooperate with Client, Matter, Event, or said Task, or is subsumed within or merged with the Matter.

Event Data

Event data preferably comprises data about significant events relating to the professional services being rendered. Event data may comprise: Official Communications from Government Agencies, Orders, Motions, Notices, and any other pertinent events. Event Means may be maintained in any of the various native applications employed in the enterprise. An event may be recorded in the Docket, in physical records, or in an application specifically developed to support and record events. Alternatively, events may be recorded in any other suitable application.

Event data tracked by the present invention preferably include any one or more of various data about any significant event in conjunction with the project, including without limitation: Event Date; Date that the event record was created; Identification of the event; Description; Assessment of its impact; Milestones achieved or implicated by the event; Responsible professional; Routing information; and any other pertinent information about the event. Event data may further comprise information relating to retirement of the event. Event data may be the same, overlap, or different than data tracked by any of the software applications used in the legal practice.

The Client Name, Client Number, Matter name and Matter number information preferably is adapted to be supplied to the Event data automatically, without requiring additional key entry or transfer of data by the user.

Task Data

Task data preferably comprises data about the task being performed. Task data may comprise specific items of work that may be conducted in conjunction with rendering the professional services. Task data tracked by the present invention may include any of various data about tasks relating to the services, including without limitation: Identification of the task; Description; Task Creation or Assignment Date; Due Date; any Milestones; Estimated time and resources to complete the task; Priority; to Whom the task has been assigned; Routing; and any other pertinent information about the task.

Task data preferably are dependant from the Matter or Project, at the same level of dependency as the Event. Task data preferably further comprises information relating to closure of the task.

The present invention preferably is adapted to enable Client, Matter, Project, and Event and Task to cooperate with one another and/or one or more external applications to facilitate transfer of data. For example, the Client Name, Client Number, Matter Name, and Matter Number information of the Client and Matter of the present invention preferably are transferred and automatically posted to the Event and Task of the present invention. Further, data is preferably transferred from one or more applications external to or cooperating with the present invention.

In alternative preferred embodiments, the present invention may further comprise one or more of: Documentation; Forms; Budget data; Expense data; Project Management data: Project Evaluation data; and Reports. Each may cooperate with one or more of: Client, Matter; Project; Event; or Task.

Documentation

Documentation may be provided to enable access to documents relating to the Project through the common data format interface, without having to separately access the records in their native application or through a document management application. Documentation preferably comprises copies of or links to several of the available documentation relating to a project, including without limitation: indices or summaries; document management system; document assembly system; links to the document(s), copies of the documentation in a common or different data format; or any other information about documentation desired by the user.

In a preferred embodiment of the present invention, Documentation further comprises an icon or link, in the Event or other field, to the document in a portable or application-independent format (such as an ODBC, relational databases; SQL, XML, HTML, .tif, .jpg, or .pdf file); over the Internet, an extranet, or intranet; a link to the document in a document management system in its native format; or other suitable means adapted to facilitate access to the document.

Forms

Forms may be provided to enable access to forms or work product precedents relating to the Project through the database. Alternatively Documentation may further comprise forms or precedents useful in the practice. These forms may be embodied in sample matters for that type of project, appended as forms in a shell format to matters of specific types, or otherwise made available to professionals working on a matter. Preferably the forms are made available through the database of the present invention, without having to separately access the records in their distributed native application or through a separate document management or document assembly application. Alternatively, the database of a preferred embodiment of the present invention may comprise links to these other distributed systems.

Forms preferably are adapted to certain milestones or Events that typically involve the preparation of certain work product in response. Once the milestone or event has been reached, the system preferably accesses the appropriate form. This access may include links to pertinent forms, including without limitation: indices or summaries; address information of the document in document management or document assembly systems; automatic assembly of the completed from data available in the system of the present invention; links to the form document(s); copies of the forms in a common or compatible data format; or any other information about form(s) desired by the user.

Budgeting, and Time and Billing

Budgets may be provided to identify projected and actual budget performance for the project, matter, or engagement. Some of the tools that may be used in conjunction with the present invention preferably include, without limitation: Tables; Schedules; Spreadsheets; Databases; Graphs; Indicia; Icons; and any other means adapted to provide budget information for a project or matter. Budgets of the present invention may take any format suitable for use in conjunction with the system for providing useful budgeting information. Budgets could be tracked separately by expenses and fees, as well as at various discrete stages of the project.

In the context of rendering legal services, various types of budgeting software are generally used, including without limitation: TMC; Elite; Broadway, CMS Open; and various others. Some of these software systems include budget modules or budget functionality that may be adapted for use in conjunction with the present invention. These prior systems, however, have been hampered by their inability effectively to deliver budgeting data to the user in a format in which it can readily be used or manipulated, such as Excel spreadsheets. It may be necessary, therefore, to export the data from these financial accounting software packages to other format(s) from which it can be used more effectively in management of the professional services practice. This export can be accomplished by dumping the data to spreadsheets adapted to cooperate with the system of the present invention through VLOOKUP Tables, SQL queries; or any other suitable means.

Data may be exported in particular format(s) so that they can be read by or transferred to the system and method of the present invention. Alternatively, data may be exported directly to the system to the present invention or to an intermediate database. Suitable databases could include: Crystal Reports; Excel; Notes; SQL; Windows-compatible; Cold Fusion; HTML; XML; relational databases; ASCII; ODBC-compatible; or any other format, that is adapted for use in conjunction with the system and/or method of the present invention.

For example, using a TMC Accounting system, the invention may export: Default budgeting information from the TMC system; Monthly Fees; Monthly Expenses; Accrued Fees (from inception, year to date, or other suitable period or by category), and/or Accrued Expenses (from inception, year to date, or other suitable period, or by category).

In the context of an intellectual property practice, for example, budgets could be established for any one or more of the following: Preliminary Patentability Assessment; Patent Application Preparation and Prosecution; Trademark Clearance; Trademark Application Preparation and Prosecution; Copyright Application Preparation and Prosecution; Opinion of Counsel; Patent Infringement Litigation; Trademark Infringement Litigation; Copyright Infringement Litigation; Patent Cooperation Treaty filings; Foreign Trademark Application filings; and any other project suitable for determination and tracking of a project budget.

Each of these categories of project types may be further defined based on the complexity of the project. For example, in a preferred embodiment of the present invention budgets are prepared based upon a simple, intermediate, or complex level of effort for patent infringement claims or patent preparation and prosecution. Similarly, varying levels of budgeting could be offered to the user based upon the complexity of a trademark infringement claim, or other projects.

Budgets tracked by the present invention preferably include variations from the budget and expenditure information about the project, including without limitation: estimated budget(s) for the project; breakdown by stages; fees and expenses; accrued costs; payables information; accounts receivable information; graphical comparisons of projected budget and actual expenditures; and any other information desired about the financial performance of the project.

In alternative preferred embodiments of the present invention Budgets may further comprise a graphical interface for indicating to the user the budget for the project relative to the accrued fees and expenses to date. This can be accomplished through any suitable graphical interface, such as the silo format, employed in many video games for depicting resources relative to expenditures, or other suitable format.

Project Management

Project Management tools may be provided to enhance management of the professional services project. Links to tools such as Microsoft Project and/or Project Gateway databases that provide project management tools may be adapted to cooperate with the aggregated data.

In alternative preferred embodiments, flowcharts may be provided of the steps being performed in conjunction with the project. FIGS. 14-16 illustrate sample flowcharts for a patent prosecution, counseling and advice, and litigation matters, respectively. The flowchart is preferably colored, illuminated, or provided with any other suitable indicator of the progress of the project. In preferred embodiments of the present invention these milestones may be keyed to certain event means achieved during the course of the project.

Project Evaluation

Project Evaluation tools may be provided to assess the project. Risk assessment tools, such as litigation risk management tools, decision tree tools, and various other tools could be provided and/or adapted to the aggregated data. For example, TreeAge or other suitable risk assessment software may be coordinated with the present invention to cooperate to provide project evaluation tools based upon the aggregated data.

Reports

Reports may also be provided to enable the project manager to "slice and dice" the aggregated data in various ways to create and prepare various assessments. In preferred embodiments of the present invention, it may be desired to summarize the data in Excel spreadsheets or other suitable summary formats. In a preferred embodiment of the present invention, reporting systems, such as Crystal Reports, can be adapted to provide the reporting function of the present invention.

System and Method of Integrating Data Through an ODBC-Compliant Lotus Notes Database Cooperating with SQL and Cold Fusion Server Means The present invention preferably comprises a software application 400, such as a database or data warehouse running in Lotus Notes or other suitable application. Data 100 preferably is drawn from the native application(s) 200 and transferred to an ODBC-compliant, Practice Management Application database 400, through SQL server 300 and Cold Fusion server 350 means, so that it may provide the integrated data 150 in a form that is accessible by user(s) 500 or other application(s) 550.

Project Management Application Database

The system and method of the present invention are preferably implemented through a personal computer-based system, operating in a distributed network environment, using local and wide area network server technology of the type well known in the art. In a preferred embodiment, the system of the present invention is preferably implemented on Novell network, with ODBC-compliant database means 400 running on a Lotus Notes server, cooperating with a SQL server 300 and Cold Fusion server 350 means, in communication with various servers, routers and network components of a type that are well known in the art. These systems maintain and support the software applications 200, and facilitate access to various documentation, docketing, accounting, budgeting, and billing information 100, as desired.

In a preferred embodiment, as shown in FIGS. 4 and 5, data 100 is maintained in data storage means, typically in various native applications or server means 200: docketing data in a proprietary format, such as a CPI or other docketing system 210; accounting data in a proprietary format, such as TMC or other accounting system 220; records in physical (paper) copies, email (ftp, ip, html, xml or other web enabled formats), and/or electronic image files (.tif, .pdf, .jpg and other formats) 280, documents (.doc, .wpd, and comparable formats), and related indices (document management systems such as DocsOpen) 230; Address Books in a relationship management system (such as Notes Address Books, Windows Outlook, Rolodex, iEnterprise, Aptus, or other relationship management software) 240; Word Processing and Work Product in word processing applications (Word and/or WordPerfect) and related indexing systems (such as DocsOpen or SoftSolutions) 230; presentation tools (such as PowerPoint and Corel Presentations); project management tools, such as Microsoft Project or Project Gateway 250; litigation support data means, such as Condordance, Case Map/Time Map, and other suitable databases 260 and imaging means 270 for providing images of documents and records used in supporting litigation; and evaluation tools (such as Excel, Corel Quatro Pro, TreeAge decision tree software and other risk evaluation tools) and other application software means used in the professional services practice 290. Some of these formats are in "common" (relational databases, SQL databases, HTML, and XML), while others are "proprietary" (CPI, TMC, Microsoft Word, Microsoft Excel).

Data storage means 200 preferably comprises data storage systems of the type well-known in the art, including, without limitation, any one or more of: hard drives; network drives; floppy or zip drives; tape or disc drives; any other suitable optical, magnetic, or other memory; or various types of data storage devices. Alternatively, by employing common data formats or proprietary formats that are adapted to transfer information to common formats, it may be possible to eliminate the use of physical storage devices and access the information directly from its source, as needed.

To the extent the native application 200 formats, even if proprietary, are compliant with a common data standard, such as ODBC-compliant databases, the data may be transferred to the project management application 400 of the present invention through appropriate data transfer means 330. In a preferred embodiment of the present invention, employing an ODBC-compliant Lotus Notes database 400 and ODBC-compliant CPI Docketing means 210, the transfer may be accomplished by using an appropriate ODBC link tool 330, such as Distributed Enterprise Connectivity System (DECS).

In a preferred embodiment of the present invention, practice management means 400, either in response to a user inquiry, on a scheduled basis, or based upon some other triggering event, queries 610 Notes DECS means 330. Notes DECS means 330 in turn queries 620 ODBC-compliant application 210 with the request ODBC-compliant application 220 responds 630 to ODBC-compliant Notes DECS means 330 with a response. ODBC-compliant, Notes DECS means 330 then transfers data 100 to practice management means 400.

Alternatively, when the native application 200 format(s) are incompatible with ODBC standards, such as various proprietary systems of the type typically used in law firms for their accounting, and time and billing functions 220, data 100 may be retrieved through SQL queries. As shown in FIGS. 4 and 5, SQL server means 310, cooperates with SQL ODBC Driver Means 320 to transfer data from application 220 to practice management means 400. Preferably, as shown in FIGS. 4 and 5, SQL server means 310, cooperates with SQL ODBC Driver Means 320 and Cold Fusion Web server means 350 to transfer data from application 220 to practice management means 400.

In a preferred embodiment of the present invention, practice management means 400, either in response to a user inquiry, on a scheduled basis, or based upon some other triggering event, queries 710 Cold Fusion server means 350 with a request. Cold Fusion web server means 350, in turn, queries 720 SQL server means 310 with the request 720. SQL server means 310 queries 730 ODBC SQL Driver means 320, which in turn queries 740 proprietary application 220, requesting the desired data. In response to the request, proprietary native application means 220 issues a response 750 to ODBC SQL Driver means 320, which transfers the response 750 to SQL Server means 310. SQL server means 310 then transfers the response 760 to Cold Fusion server means 350, which in turn transfers response 770 to practice management means 400.

Several of the types of applications 200 typically used in a professional services practice, for example, certain document management systems 230 and other software applications, even if proprietary, are compliant with a common data standard, such as ODBC standards, the data may be transferred to the project management application 400 of the present invention through appropriate data transfer means 330. In a preferred embodiment of the present invention, employing an ODBC-compliant Lotus Notes database 400 and ODBC-compliant CPI Docketing means 210, the transfer may be accomplished directly through SQL server means as shown in FIG. 5. These may include document management, other ODBC-compliant databases, project management tools, risk management tools, Concordance and IPRO litigation management databases, and various other database applications used in a legal services practice.

These conversions and transfers preferably are carried out in a manner well-known in the art. Michael Blaha, in his book, "A MANAGER'S GUIDE TO DATABASE TECHNOLOGY" Prentice Hall (2001), which is incorporated herein by reference in its entirety, describes several approaches to database design and development. These, and other techniques would be within the level of ordinary skill in the art in implementing the present invention.

It will be apparent to persons of ordinary skill in the art that various modifications and variations may be made in connection with the database of the present invention, without departing from the scope of the invention as claimed. For example, the invention may be implemented with any suitable data storage and/or transfer means. The order of the steps, and in particular storage and transfer of the data are not critical. Data may be stored in the native application and accessed as needed. Alternatively, data may be stored in a portable or application-independent format. Further, data could be accessed by the application either as needed or on the basis of periodic updates and stored in the application being used to display the data. Thus, the order of the steps and the specific location where any one or more of the data means are stored are not critical. The data desired need only be available when needed.

It will also be apparent to persons of ordinary skill in the art that variations and modification may be made to the method of the present invention. For example, the order of steps in the process of the present invention, the particular hardware and software implementation are not critical. The present invention is also preferably adapted to track and manage quality control systems for the management of business processes other than a professional services practice. Thus, it is intended that the variations and modifications of the invention and its components are considered part of the invention, without departing from the scope or spirit of the invention as disclosed and claimed, provided they come within the scope of the appended claims and their equivalents.

I claim:

1. A system for managing data relating to a professional legal services project and making the data available to a user, where the data is maintained in two or more software applications having different formats comprising:
   a. a first software application for maintaining data in a first portable format;
   b. a second software application for maintaining data in a second format other than said first portable format;
   c. a first server;
   d. a second server;
   e. a professional services project management application;
   f. said first server being adapted to communicate with said first software application and said professional services project management application to transfer the data from said first software application to said professional services project management application;
   g. said second server being adapted to communicate with said first server and said professional services project management application;
   h. said second server cooperating with said first server to communicate with said second software application by querying said first server to retrieve the data from said second software application in said first portable format and to transfer the data from said second software application to said professional services project management application;
   i. said system further comprising an interface for communicating the data to the user.

2. The system of claim 1, wherein said professional services project management application comprises a shareware application.

3. The system of claim 1, wherein said professional services project management application comprises a Lotus Notes database.

4. The system of claim 1, wherein said first software application is adapted to maintain data selected from the group consisting of docketing, word processing, Notes database, document management, email, records, forms, workflow, conflicts, expense, budgeting, risk management, project management, database, imaging, and reporting data.

5. The system of claim 1, wherein said second software application is adapted to maintain data selected from the group consisting of: accounting, time, billing, expense, cost, and budgeting data.

6. The system of claim 1, wherein said first software application is adapted to maintain data selected from the group consisting of: docketing, word processing, Notes database, document management, email, records, forms, workflow, conflicts, expense, risk management, project management, database, imaging, and reporting data; and said second software application is adapted to maintain data selected from the group consisting of: accounting, time, billing, expense, cost, and budgeting data.

7. The system of claim 1, wherein said second software application is adapted to maintain accounting data.

8. The system of claim 1, wherein said second software application comprises a TMC accounting system.

9. The system of claim 1, wherein the data in said second format is incompatible for use by said first software application.

10. The system of claim 1, wherein the data in said first portable format cannot be accessed by said second software application.

11. The system of claim 1, wherein the data in said second format is retrieved via an ODBC-compliant driver.

12. A system for managing professional legal services project information from two or more software applications in which the data is maintained in different formats, and making the data available to a user, comprising:
   a. a first software application for maintaining data in a first ODBC-compliant format;
   b. a second software application for maintaining data in a second format other than an ODBC-compliant format;
   c. a first server;
   d. a second server;
   e. a professional services project management application;
   f. said second server being adapted to communicate with said first server and said professional services project management application;
   g. said first server being adapted to communicate with said first software application to transfer the data from said first software application to said professional services project management application;
   h. said first server being adapted to communicate, via querying said second server, with said second software application to retrieve the data from said second software application in said first ODBC-compliant format and to transfer the data from said second software application to said professional services project management application through said second server;
   i. said system being adapted to transfer the data to at least said first software application in said first ODRO-compliant format, and to provide an interface for communicating the data to the user.

13. The system of claim 12, wherein said professional services project management application comprises a shareware application.

14. The system of claim 12, wherein said professional services project management application comprises a Lotus Notes database.

15. The system of claim 12, further comprising an ODIRO link tool means for communicating with said first software application.

16. The system of claim 14, further comprising an ODBC link tool means for communicating with said Notes database.

17. The system of claim 16, wherein said ODBC link tool comprises a Notes Distributed Enterprise Connectivity System.

18. The system of claim 12, wherein said first software application is adapted to maintain data selected from the group consisting of docketing, word processing, Notes database, document management, email, records, forms, workflow, conflicts, expense, budgeting, risk management, project management, database, imaging, and reporting data.

19. The system of claim 12, wherein said second software application is adapted to maintain data selected from the group consisting of: accounting, timer billing, expense, cost, and budgeting data.

20. The system of claim 12, wherein said first software application is adapted to maintain data selected from the group consisting of: docketing, word processing, Notes database, document management, email, records, forms, workflow, conflicts, expense, budgeting, risk management, project management, database, imaging, and reporting data; and said second software application is adapted to maintain data selected from the group consisting oft accounting, time, billing, expense, cost, and budgeting data.

21. The system of claim 12, wherein said second software application is an accounting application.

22. The system of claim 12, wherein said second software application comprises a TMC accounting system.

23. The system of claim 12, wherein the data in said second format is incompatible for use by said first software application.

24. The system of claim 12, wherein the data in said first ODBC-compliant format cannot be accessed by said second software application.

25. The system of claim 12, wherein the data in said second format is retrieved via an ODBC-compliant driver.

26. A method of managing professional services project information, comprising the steps of:
   a. maintaining data in a first software application in a first portable format, comprising one or more of an ODBC-compliant, HTML, or other relatively open data format;
   b. maintaining data in a second software application in a second format other than said first portable format, comprising a closed or proprietary data format relative to said first portable format of said first software application;
   c. communicating the data from said first software application to a professional services project management application through a first server;
   d. communicating the data from said second software application to said professional services project management application through said first server querying a second server to retrieve the data from said second software application in said first portable format; and
   e. providing the data to the user through said professional services project management application.

27. The method of claim 26, wherein said professional services project management application comprises a shareware application.

28. The method of claim 26, wherein said professional services project management application comprises a Lotus Notes database.

29. The method of claim 26, wherein said first software application is adapted to maintain data selected from the group consisting of: docketing, word processing, Notes database, document management, email, records, forms, workflow, conflicts, expense, budgeting, risk management, project management, database, imaging, and reporting data.

30. The method of claim 26, wherein said second software application is adapted to maintain data selected from the group consisting of: accounting, time, billing, expense, cost, and budgeting data.

31. The method of claim 26, wherein said first software application is adapted to maintain data selected from the group consisting of: docketing, word processing, Notes database, document management, email, records, forms, workflow, conflicts, expense, budgeting, risk management, project management, database, imaging, and reporting data; and said second software application is adapted to maintain data selected from the group consisting of: accounting, time, billing, expense, cost, and budgeting data.

32. The method of claim 26, wherein said second software application is an accounting application.

33. The method of claim 26, wherein said second software application comprises a TMC accounting system.

34. The method of claim 26, wherein the data in said second format is incompatible for use by said first software application.

35. The method of claim 26, wherein the data in said first portable format cannot be accessed by said second software application.

36. The method of claim 26, wherein the data in said second format is retrieved via an ODBC-compliant driver.

37. A distributed computer network adapted for use in a professional service practice, comprising:
   a. a first software application for maintaining data in a first, ODBC-compliant format;
   b. a second software application for maintaining data in a second format other than an ODBC-compliant format;
   c. a SQL server means;
   d. a Cold Fusion web server means;
   e. a professional services project management application;
   f. said SQL server means being adapted to communicate with said first software application and said professional services project management application to transfer the data from said first software application to said professional services project management application;
   g. said Cold Fusion server means being adapted to communicate with said SQL server means and said professional service project management application;
   h. said Cold Fusion server means cooperating with said SQL server means to communicate with said second software application by querying said SQL server means to retrieve the data from said second software application in said first ODBC-compliant format and to transfer the data from said second software application to said professional services project management application;
   i. said professional services project management application being adapted to transfer the data to at least said first software application in said first ODBG-compliant format, and to provide an interface for communicating the data to the user.

38. The network of claim 37, wherein said professional services project management application comprises a shareware application.

39. The network of claim 37, wherein said professional services project management application comprises a Lotus Notes database.

40. The network of claim 37, further comprising an ODBC link tool means for communicating with said first software application.

41. The network of claim 40, further comprising an ODBC link tool means for communicating with said Notes database.

42. The network of claim 41, wherein said ODBC link tool comprises a Notes Distributed Enterprise Connectivity System.

43. The network of claim 37, wherein said first software application is adapted to maintain data selected from the group consisting of: docketing, word processing, Notes database, document management, email, records, forms, workflow, conflicts, expense, budgeting, risk management, project management, database, imaging, and reporting data.

44. The network of claim 37, wherein said second software application is adapted to maintain data selected from the group consisting of: accounting, time, billing, expense, cost, and budgeting data.

45. The network of claim 37, wherein said first software application is adapted to maintain data selected from the group consisting oft docketing, word processing, Notes database, document management, email, records, forms, workflow, conflicts, expense, risk management, project management, database, imaging, and reporting data; and said second software application is adapted to maintain data selected from the group consisting of: accounting, time, billing, expense, cost, and budgeting data.

46. The network of claim 37, wherein said second software application is an accounting application.

47. The network of claim 37, wherein said second software application comprises a TMC accounting system.

48. The network of claim 37, wherein the data in said second format is incompatible for use by said first software application.

49. The network of claim 37, wherein the data in said first ODBC-compliant format cannot be accessed by said second software application.

50. The network of claim 37, wherein the data in said second format is retrieved via a SQL query.

51. A network for managing professional legal services project information from two or more software applications in which the data is maintained in different formats, and making the data available to a user, comprising:
   a. a first software application for maintaining data in a first ODBC-compliant format;
   b. a second software application for maintaining data in a second format other than an ODBC-com pliant format;
   c. a first server;
   d. a second server;
   e. a professional services project management application;
   f. said second server being adapted to communicate with said first server and said professional services project management application;
   g. said first server being adapted to communicate with said first software application to transfer the data from said first software application to said professional services project management application;
   h. said first server being adapted to communicate, via querying said second server, with said second software application to retrieve the data from said second software application in said first ODBC-compliant format and to transfer the data from said second software application to said professional services project management application through said second server;
   i. said professional services project management application being adapted to transfer the data to at least said first software application in said first ODBC-compliant format, and to provide an interface for communicating said first and second data to the user.

52. The network of claim 51, wherein said professional services project management application comprises a shareware application.

53. The network of claim 51, wherein said professional services project management application comprises a Lotus Notes database.

54. The network of claim 51, further comprising an QDBC link tool means for communicating with said first software application.

55. The network of claim 53, further comprising an ODBC link tool means for communicating with said Notes database.

56. The network of claim 55, wherein said ODBC link tool comprises a Notes Distributed Enterprise Connectivity System.

57. The network of claim 51, wherein said first software application is adapted to maintain data selected from the group consisting of: docketing, word processing, Notes database, document management, email, records, forms, workflow, conflicts, expense, budgeting, risk management, project management, database, imaging, and reporting data.

58. The network of claim 51, wherein said second software application is adapted to maintain data selected from the group consisting of: accounting, time, billing, expense, cost, and budgeting data.

59. The network of claim 51, wherein said first software application is adapted to maintain data selected from the group consisting of docketing, word processing, Notes database, document management, email, records, forms, workflow, conflicts, expense, budgeting, risk management, project management, database imaging, and reporting data; and said second software application is adapted to maintain data selected from the group consisting of: accounting, time, billing, expense, cost, and budgeting data.

60. The network of claim 51, wherein said second software application is an accounting application.

61. The network of claim 51, wherein said second software application comprises a TMC accounting system.

62. The network of claim 51, wherein the data in said second format is incompatible for use by said first software application.

63. The network of claim 51, wherein the data in said first ODBC-compliant format cannot be accessed by said second software application.

64. The network of claim 51, wherein the data in said second format is retrieved via an ODBC-compliant driver.

65. A system for managing data relating to a professional legal services project and making the data available to a user, where the data is maintained in two or more software applications having different formats comprising:
   a. a first software application for maintaining data in a first portable format;
   b. a second software application for maintaining data in a second format, wherein the second format is not a portable format;
   c. a first server;
   d. a second server;
   e. a professional services project management application;
   f. said first server being adapted to communicate with said first software application and said professional services project management application to transfer the data from said first software application to said professional services project management application;
   g. said second server being adapted to communicate with said first server and said professional services project management application;
   h. said second server cooperating with said first server to communicate with said second software application by querying said first server to retrieve the data from said second software application in said first portable format and to transfer the data from said second software application to said professional services project management application;
   i. said system further comprising an interface for communicating the data to the user.

66. A distributed computer network adapted for use in a professional service practice, comprising:
   a. a first software application for maintaining data in a first, ODBC-compliant format;
   b. a second software application for maintaining data in a second format, wherein the second format is not a portable format;
   c. a SQL server means;
   d. a Cold Fusion web server means;
   e. a professional services project management application;
   f. said SQL server means being adapted to communicate with said first software application and said professional services project management application to transfer the data from said first software application to said professional services project management application;

g. said Cold Fusion server means being adapted to communicate with said SQL server means and said professional service project management application;

h. said Cold Fusion server means cooperating with said SQL server means to communicate with said second software application by querying said SQL server means to retrieve the data from said second software application in said first ODBC-compliant format and to transfer the data from said second software application to said professional services project management application;

i. said professional services project management application being adapted to transfer the data to at least said first software application in said first ODBC-compliant format, and to provide an interface for communicating the data to the user.

* * * * *